United States Patent [19]

Takanashi et al.

[11] Patent Number: 5,144,471

[45] Date of Patent: Sep. 1, 1992

[54] OPTICAL SCANNING SYSTEM FOR SCANNING OBJECT WITH LIGHT BEAM AND DISPLAYING APPARATUS

[75] Inventors: Itsuo Takanashi, Kamakura; Shintaro Nakagaki, Fujisawa; Tsutou Asakura, Yokohama; Masato Furuya; Tetsuji Suzuki, both of Yokosuka; Hirohiko Shinonaga, Yokohama, all of Japan

[73] Assignee: Victor Company of Japan, Ltd., Yokohama, Japan

[21] Appl. No.: 543,404

[22] Filed: Jun. 26, 1990

[30] Foreign Application Priority Data

Jun. 27, 1989 [JP] Japan .................. 1-164855

[51] Int. Cl.$^5$ .............................................. G02F 1/01
[52] U.S. Cl. .................................. 359/245; 359/254; 359/259; 359/246; 359/72
[58] Field of Search ............... 350/355, 384, 335, 345, 350/337, 358, 342; 340/784; 359/245, 246, 250, 254, 259, 41, 53, 63, 72

[56] References Cited

U.S. PATENT DOCUMENTS

| | | | |
|---|---|---|---|
| 4,191,955 | 3/1980 | Robert | 340/784 |
| 4,236,150 | 11/1980 | Chern | 340/765 |
| 4,911,536 | 3/1990 | Ditzik | 350/345 |

FOREIGN PATENT DOCUMENTS 0046731  2/1989  Japan ................... 350/355

OTHER PUBLICATIONS

Applied Optical Electronics Handbook: pp. 534–546.

Primary Examiner—Rolf Hille
Assistant Examiner—Tan Ho
Attorney, Agent, or Firm—Pollock, VandeSande & Priddy

[57] ABSTRACT

An electromagnetic radiation beam scanning system for scanning an object with an electromagnetic radiation beam. The scanning system comprises first and second beam-narrowing devices which are arranged so as to have elongated light-transmission regions, respectively, and which are overlapped each other so that the light-transmission regions intersect each other. Each of the beam-narrowing devices includes a light modulation layer showing an electro-optic effect, first and second electrodes disposed so as to sandwich the light modulation layer, first and second polarizers disposed so as to sandwich the light modulation layer and a power source for applying voltages to the first and second electrodes. The light modulation layer combined with the polarizers forms the elongated light-transmission region in response to application of the voltages to the first and second electrodes due to the power source so as to produce a narrowed beam when a light beam is incident thereon. The position of each of the light-transmission regions in each of the first and second beam-narrowing devices is arranged to be movable in response to variation of at least one of the application voltages due to the power source.

10 Claims, 7 Drawing Sheets

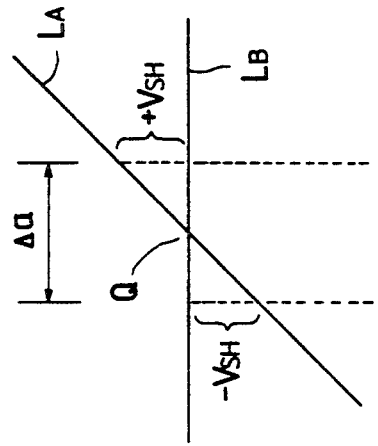
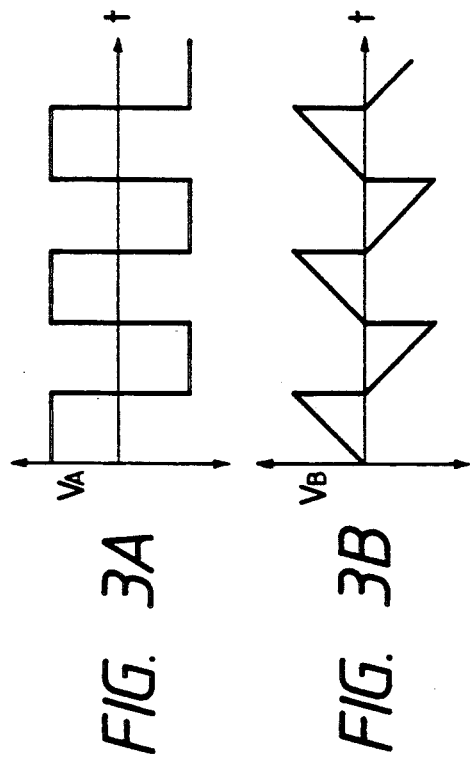
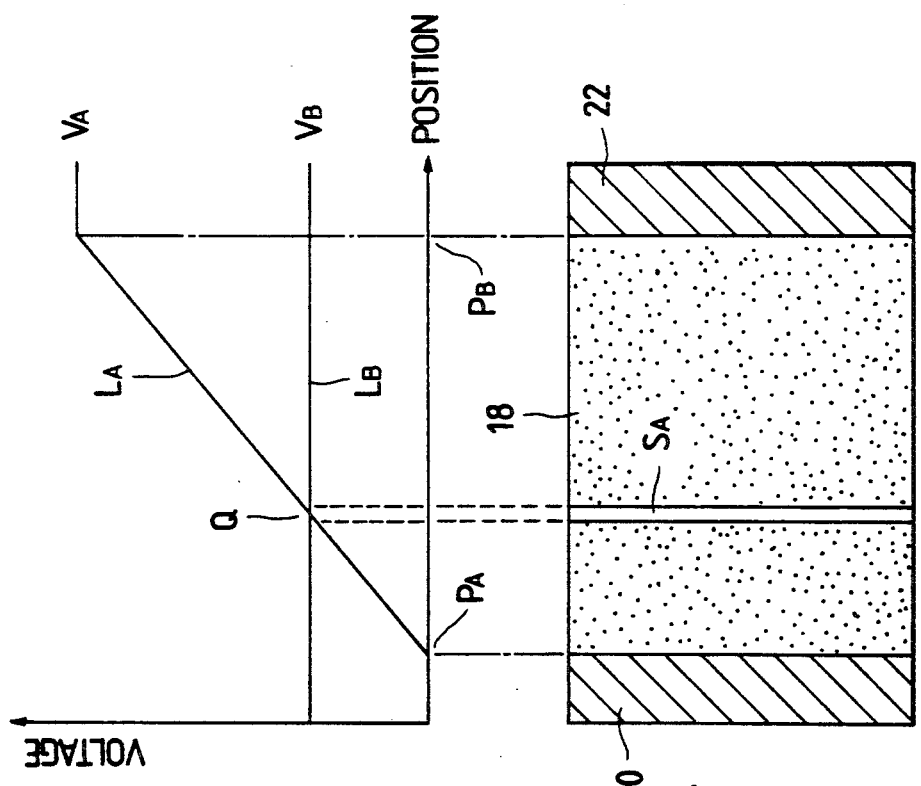

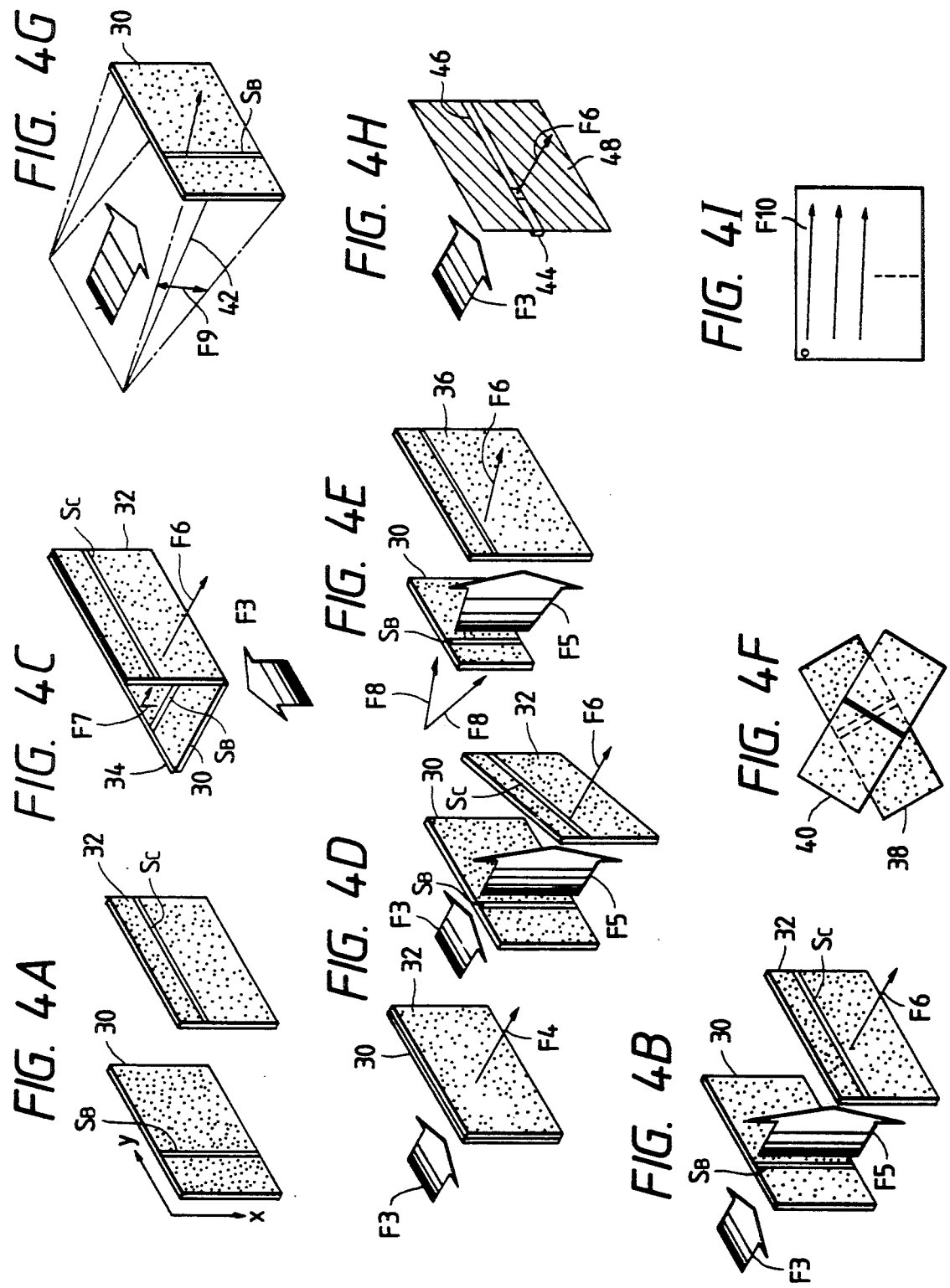

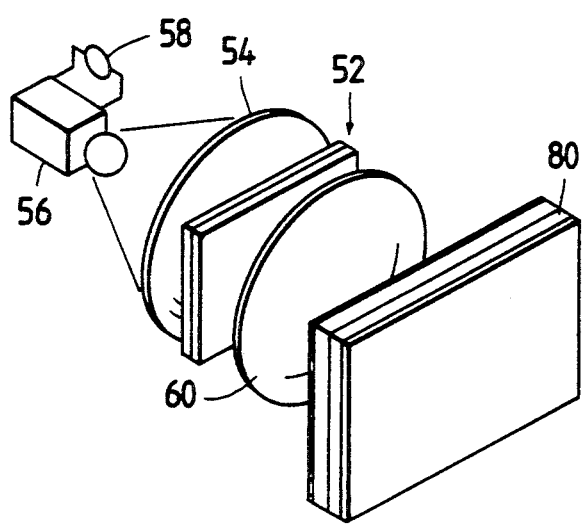
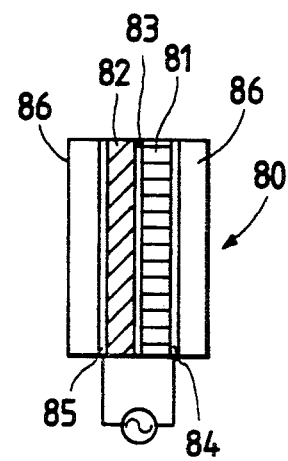
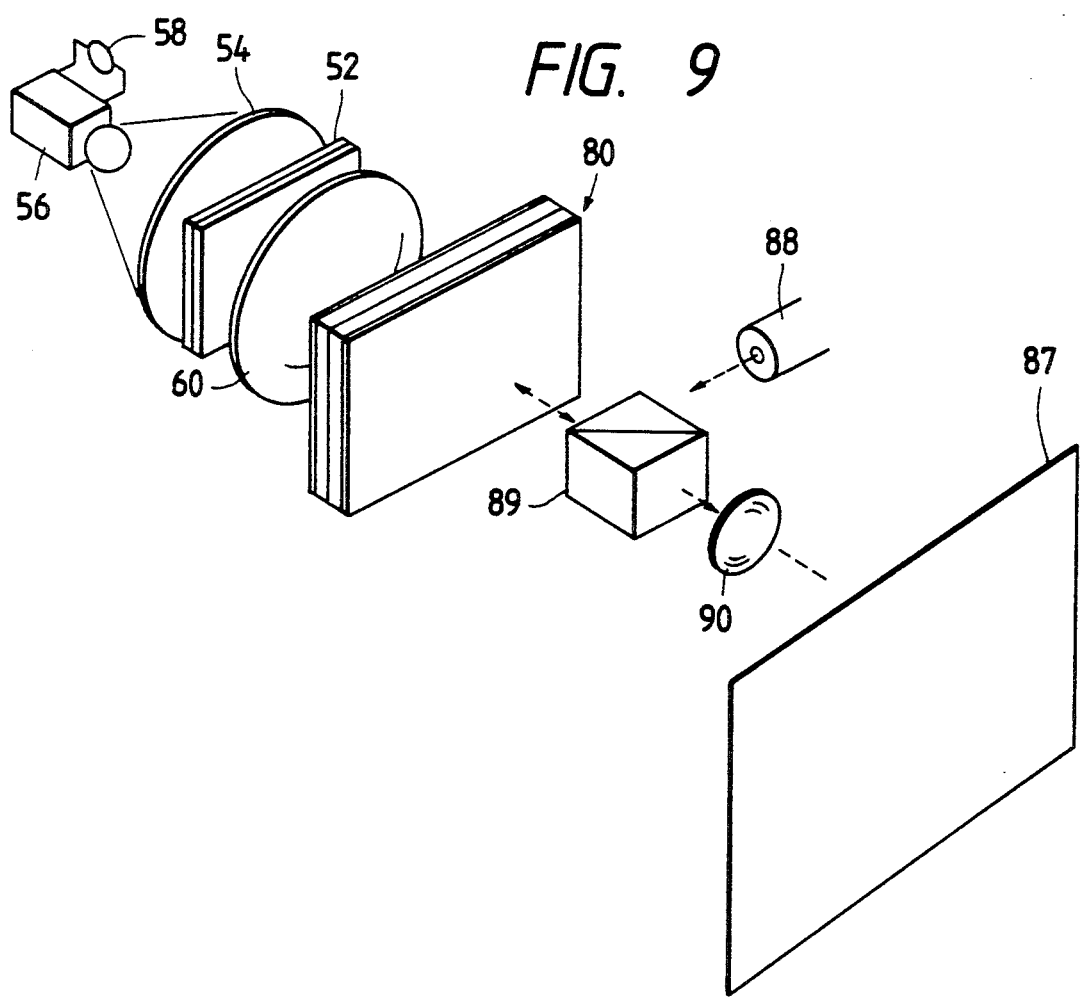

OPTICAL SCANNING SYSTEM FOR SCANNING OBJECT WITH LIGHT BEAM AND DISPLAYING APPARATUS

BACKGROUND OF THE INVENTION

The present invention relates to optical scanning systems and optical displaying apparatus comprising the optical scanning system. The optical scanning system is also applicable to other applications such as optical recording/reproducing apparatus and optical computers.

Various types of optical scanning devices such as mechanically mirror-movable type scanners and electro-optic or acousto-optic deflecting type scanners have been developed hitherto with a view to scanning an object with a light beam or an electromagnetic radiation beam in optical indication fields, for example. There is a problem which arises with the conventional mechanically mirror-movable type optical scanner, however, in that mechanical troubles easily occur because of provision of mechanically mirror-moving mechanism for beam reflection in different directions and the optical system inevitably becomes complicated. Further, an important problem in the conventional electro-optic deflecting type scanner relates to the fact that the deflecting angular range is relatively small so as to make it difficult to widely scan an object with an electromagnetic radiation beam.

SUMMARY OF THE INVENTION

It is therefore an object of the present invention to provide an optical scanning device which is capable of being simply constructed without having a mechanically moving mechanism concurrently with widely scanning an object.

With this and other objects which will become apparent as the description proceeds, an electromagnetic radiation beam scanning system according to the present invention comprises first and second beam-narrowing devices. Each of the first and second beam-narrowing devices includes a light modulation layer showing an electro-optic effect, first and second electrodes disposed so as to sandwich the light modulation layer, and first and second polarizers interposing the light modulation layer. Also included in the beam-narrowing device is a power source means for applying voltages to the first and second electrodes, whereby the light modulation layer forms an elongated region which becomes electro-optically inactive in response to application of the voltages to the first and second electrodes due to the power source means thereby the light modulation layer combined with the polarizers causes the production of a narrowed beam when a light beam is incident thereon. The first and second beam-narrowing devices are overlapped so that the elongated light-transmission regions intersect each other. The position of each of the light-transmission regions in each of the first and second beam-narrowing devices is arranged to be movable in response to a variation of at least one of the application voltages due to the power source means.

BRIEF DESCRIPTION OF THE DRAWINGS

The object and features of the present invention will become more readily apparent from the following detailed description of the preferred embodiments taken in conjunction with the accompanying drawings in which:

FIGS. 2A to 2C and 3A, 3B are illustrations for describing the operation of the FIG. 1 scanning system;

FIGS. 4A to 4I show modifications of the FIG. 1 optical scanning system;

FIGS. 7 to 9 are illustrations for describing arrangements of displaying apparatus which includes the optical scanning system of this embodiment.

DETAILED DESCRIPTION OF THE INVENTION

Figure 1:
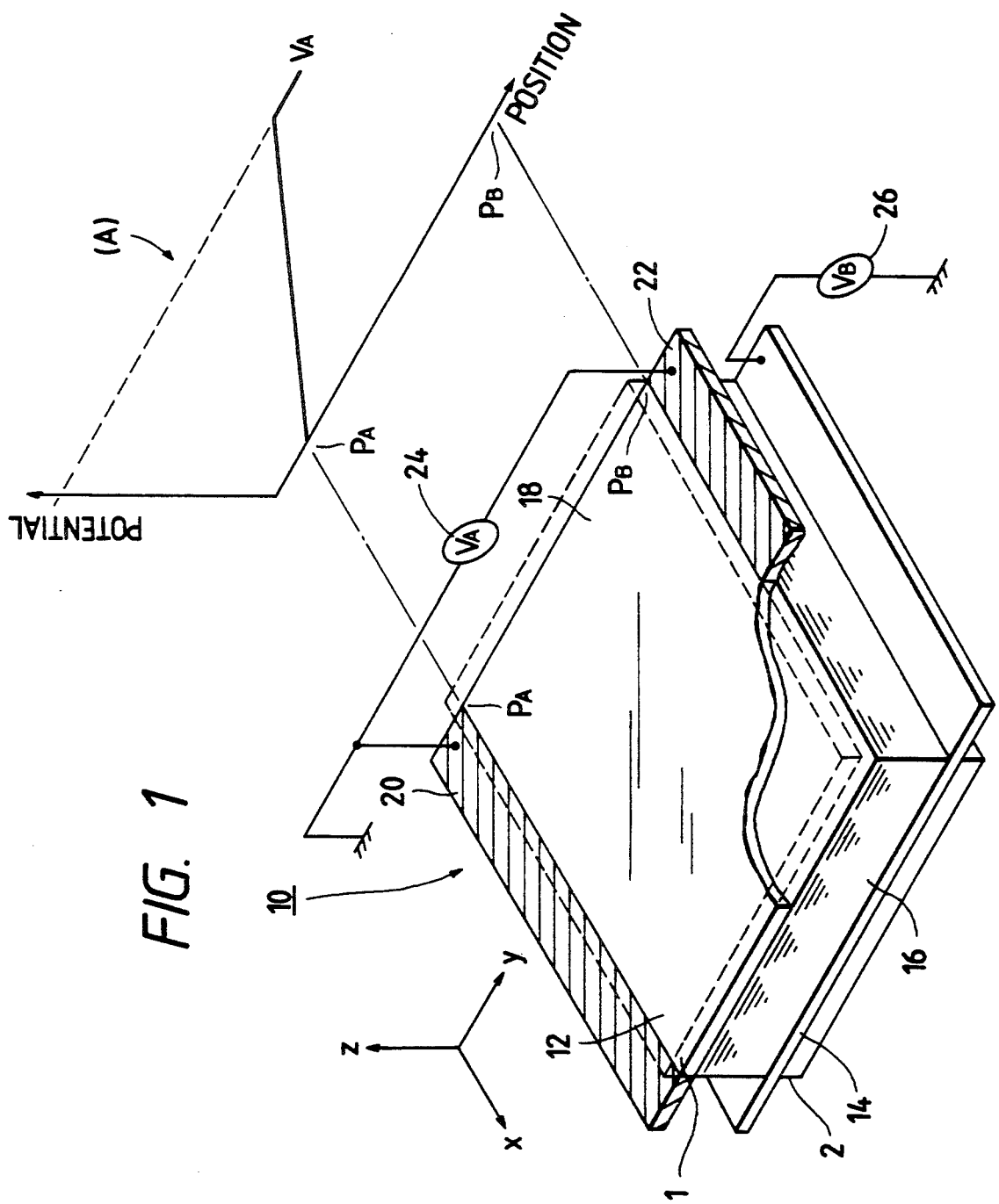
FIG. 1 is a perspective view showing a beam-narrowing device of an optical scanning system according to an embodiment of the present invention.

Referring now to FIG. 1, there is schematically illustrated an arrangement of a beam-narrowing device of an optical scanning system according to an embodiment of the present invention. In FIG. 1, the beam-narrowing device illustrated at numeral 10 includes first and second flat transparent electrodes (upper and lower flat transparent electrodes in the illustration) 12 and 14, a light modulation layer 16 interposed therebetween, and first and second polarizers 1 and 2. These polarizers 1 and 2 may be placed at each side of the light modulation layer 16 to be sandwiched by the respective electrodes 12 and 14. The transparent electrode 12 comprises a transparent section 18 and terminal sections 20, 22 placed at both end portions of the transparent section 18. The transparent section 18 evenly has an impedance and each of the terminal sections 20, 22 has an impedance extremely lower than that of the transparent section 18. A power source ($V_A$) 24 is provided between the terminal sections 20, 22 so that a voltage is applied to the transparent electrode 12 as will be described hereinafter. Here, a junction point between the power source 24 and the terminal section 20 is grounded. The other transparent electrode 14 is arranged to have an impedance extremely lower than that of the transparent section 18 of the above-described transparent electrode 12. Another power source ($V_B$) 26 is coupled to the transparent electrode 14 in order to apply a voltage thereto. The light modulation layer 16 can be made of a lithium niobate showing the electro-optic effect, a TN mode liquid crystal showing the electrostatic-rotary-polarization effect, and others. When a TN mode liquid crystal is used as the light modulation layer 16, these polarizers are so placed that the polarization axes of them are perpendicular to each other. In this embodiment, the plane of the polarization of the light which polarized in the polarizer 1 and incident to the light modulation layer 16, is twisted by 90 degrees without an electronic field to the light modulation layer 16 and corresponds with the polarization axis of the polarizer 2.

On the other hand, when lithium niobate is used as the light modulation layer 16, axes of these polarizers are set in parallel to each other.

A description will be made hereinbelow in terms of the operation of the beam-narrowing device 10 using a TN mode liquid crystal as the light modulation layer. In response to application of a constant voltage $V_A$ to the transparent electrode 12 due to the power source 24, the electric potential of the transparent section 18 thereof becomes as illustrated by (A) in FIG. 1. That is, since the terminal section 20 thereof is grounded and the impedance of the transparent section 18 thereof is uniform, the electric potential on the transparent section 18 varies linearly from a terminal section 20 side position $P_A$ toward a terminal section 22 side position $P_B$.

On the other hand, a constant voltage $V_B$ due to the power source 26 is applied to the other transparent electrode 14, as illustrated in FIG. 2A, a voltage-difference between them is applied as an effective voltage to the light modulation layer 16. At the position Q of $V_A=V_B$, i.e., at the intersection point of a line $L_A$ showing the voltage ($V_A$) due to the power source 24. with respect to portions of the transparent section 18 and a line $L_B$ showing the voltage ($V_B$) due to the power source 26 with respect to portions of the transparent electrode 14, the effective voltage becomes zero, and the effective voltage becomes negative at the side from the position Q to the position $P_A$ and becomes positive at the side from the position Q to the position $P_B$. Because of the arrangement of the polarizers described before, the light modulation layer 16 blocks the light, in connection with the polarizers, due to the electro-optic effect in response to the application of the effective voltage exceeding a predetermined range and allows the light to pass in response to the application of the effective voltage in the predetermined range.

FIG. 2B is an enlarged illustration of a portion near the position Q in FIG. 2A. In the range Δa between the thresholds $-V_{SH}$ and $+V_{SH}$, the light modulation layer 16 takes the light-transmission state. Thus, the light-transmission region $S_A$ has a narrow configuration as illustrated in FIG. 2C. In this state, when at least one of the application voltages $V_A$ and $V_B$ to the transparent electrodes 12 and 14 varies, the position Q moves whereby the formed position of the narrow light-transmission region $S_A$ moves. Further, in response to a variation of the voltage $V_A$, the inclination of the line $L_A$ varies whereby the width of the light-transmission region $S_A$ changes. Thus, when the voltage $V_A$ varies as illustrated in FIG. 3A and the voltage $V_B$ varies as illustrated in FIG. 3B, the position of the narrow light-transmission region $S_A$ periodically moves from the position $P_A$ toward the position $P_B$. Here, when a light beam is brought into either the transparent electrode 12 or 14, the light beam passes through only the transmission region $S_A$ so as to have a narrow cross section corresponding to the configuration of the light-transmission region $S_A$ and the narrow cross-section transmission light beam moves in accordance with the movement of the light-transmission region $S_A$, thereby allowing the scanning operation.

Two-dimensional scanning systems comprising the beam-narrowing device described above with reference to FIG. 1 will be described hereinbelow with reference to FIGS. 4A through 4I. FIG. 4A illustrates a two-dimensional scanning system comprising a first beam-narrowing device 30 and a second beam-narrowing device 32 which are respectively constructed so as to have substantially the same function as the beam-narrowing device described with reference to FIG. 1. The first beam-narrowing device 30 is arranged to form a narrow light-transmission region $S_B$ extending in directions indicated by an arrow x and movable in directions indicated by an arrow y, and on the other hand, the second beam-narrowing device 32 is arranged to form a narrow light-transmission region SC extending in the directions indicated by the arrow y and movable in the directions of the arrow x. Since the first and second beam-narrowing devices 30 and 32 are combined with each other so as to be totally overlapped so that the longitudinal axes of the light-transmission regions $S_B$ and $S_C$ cross each other, the light transmission is allowed only at the intersection region of the light-transmission regions $S_B$ and $S_C$. Accordingly, in response to light, incident on one surface of the scanning system from a direction indicated by an arrow F3, the scanning system emits a spotting light beam (diaphragmed light beam) from the intersection region in a direction indicated by an arrow F4. Thus, when the light-transmission region $S_B$ of the first beam-narrowing device 30 is moved in the directions indicated by the arrow y, the spotting light beam emitted from the scanning system moves in the arrow y directions, and when the light-transmission region $S_C$ of the beam-narrowing device 32 is moved in the arrow x directions, the spotting light beam moves in the arrow x directions. FIG. 4B shows a modification of the two-dimensional scanning system illustrated in FIG. 4A. In FIG. 4B, the first and second beam-narrowing devices 30 and 32 are arranged to be in confronting and spaced relation to each other. Similarly, a narrow cross-section light beam emitted from the first beam-narrowing device 30 in a direction indicated by an arrow F5 reaches the second beam-narrowing device 32 which in turn generates a spotting light beam in a direction indicated by an arrow F6. It is also possible that the first and second beam-narrowing devices 30 and 32 are combined with each other so as to be orthogonal as illustrated in FIG. 4C. In this case, an appropriate reflecting mirror 34 is additionally provided obliquely between the first and second beam-narrowing devices 30 and 32 so that the lightbeam from the first beam-narrowing device is directed through the reflecting mirror 34 to the second beam-narrowing device 32. Further, it is also appropriate that the first beam-narrowing device 30 is arranged so as to be non-parallel to the second beam-narrowing device 30 as illustrated in FIG. 4D. Still further, it is also allowed that the first beam-narrowing device 30 is arranged to be different in size from the second beam-narrowing device 32 as illustrated in FIG. 4E. In this case, a radially emitted light beam indicated by arrows F8 is arranged to be incident on the first beam-narrowing device 30 by which a narrow cross-section light beam is generated in the arrow F5 direction so as to be incident on the second beam-narrowing device 32. Moreover, as illustrated in FIG. 4F, for constructing a scanning system, first and second beam-narrowing devices 38 and 40 which have the same structure are arranged overlapping each other such that the light-transmission regions intersect at a predetermined angle other than the right angle. In this case, only the overlapping portion essentially acts as the scanning system. Further, in FIG. 4G, a scanning system comprises only the first beam-narrowing device 30 having the light-transmission region $S_B$. In this case, an appropriate light-emitting device is provided which emits a light-beam to form a narrow light spot whose longitudinal directions intersect at right angles to the longitudinal axis of the light-transmission region $S_B$ of the beam-narrowing device 30. The beam-emission angle of the light-emitting device is arranged to be changeable in an angular range indicated by an arrow F9, whereby the scanning operation is effected with the movement of the light-transmission region $S_B$ and the variation of the beam-emission angle of the light-emitting device. Finally, in FIG. 4H, on a surface of a beam-narrowing device 44 is provided a light-shutting plate 48 equipped with an elongated slit 46 which acts as a light-transmission region. Here, the scanning light beam is movable only along the longitudinal directions of the slit 46.

With the above-described arrangements in which the light-transmission regions $S_B$ and $S_C$ intersect at right angles to each other, if the movements of the light-transmission regions $S_B$ and $S_C$ are arranged to be effected in accordance with well known vertical and horizontal synchronizing signals, the scanning system can be employed for the screen scanning of a television image receiving tube as illustrated by an arrow F10 in FIG. 4I.

A displaying apparatus comprising the above-described scanning system will be described hereinbelow with reference to FIGS. 5A to 5C. In FIG. 5A, the displaying apparatus illustrated at numeral 50 comprises a two-dimensional scanning system 52 described above with reference to FIGS. 4A to 4H. Also included in the displaying apparatus 50 is a light source 56, light emitted from the light source 56 passing through a collimating lens 54 and then reaching the two-dimensional scanning system 52. The light emitted from the light source 56 is modulated in accordance with an indication or displaying signal from an indication-signal generating circuit, 58, and the scanning operation of the two-dimensional scanning system is effected in synchronism with the modulation due to the indication signal from the indication-signal generating circuit 58. A spotting light beam from the two-dimensional scanning system 52 passes through a lens 60 and is projected on a screen 62 so as to reproduce an image. Here, it is also appropriate to arrange the displaying apparatus such that an image is directly produced on a surface of the beam-narrowing device 32 of the two-dimensional scanning system 52.

Figure 5B:
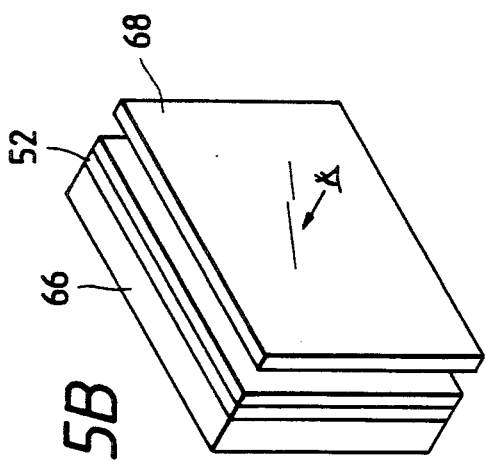
FIGS. 5A to 5C show displaying apparatus comprising the optical scanning system.
Figure 5C:
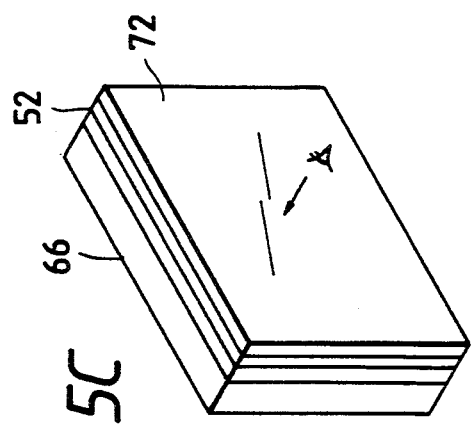
Figure 5A:
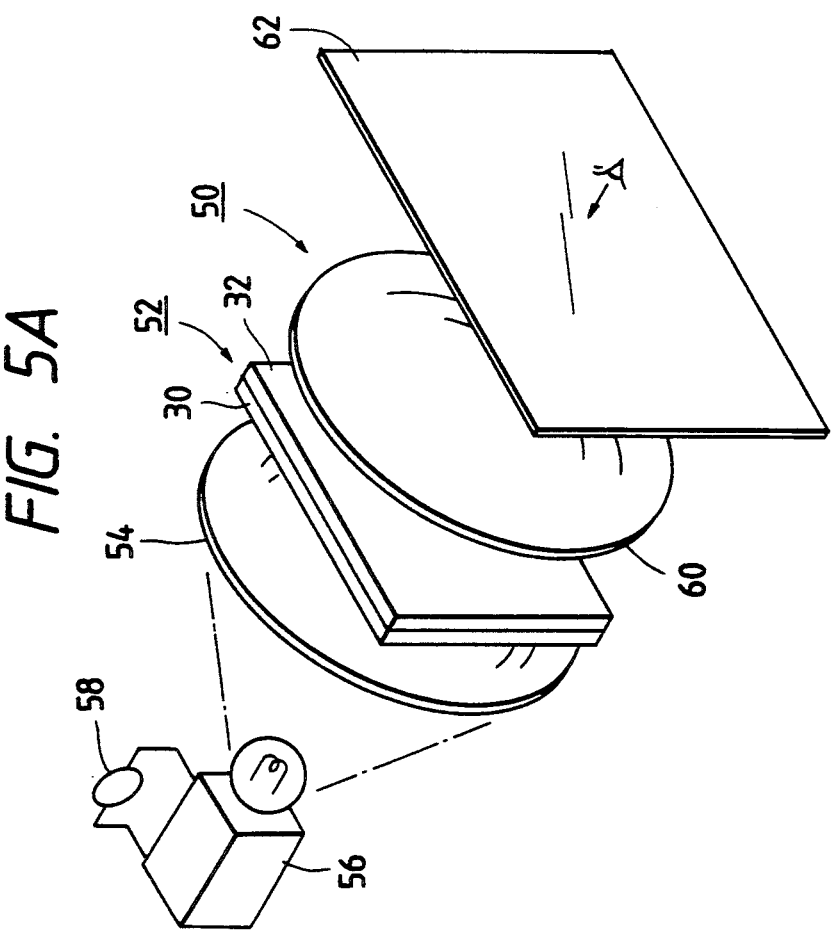

FIG. 5B shows a modification of the displaying apparatus illustrated in FIG. 5A. One difference between the FIG. 5B displaying apparatus and the FIG. 5A displaying apparatus is that there is provided a plane light source 66 instead of the light source 56. A spotting light beam from the two-dimensional scanning system 52 is directed incident on a screen 68. FIG. 5C shows a modification of the FIG. 5B displaying apparatus. One difference between the FIGS. 5B and 5C displaying apparatus is that a light-emitting layer 72 is provided on the light-exit side surface of the two-dimensional scanning system 52. The light-emitting layer 72 is arranged to be excited in response to reception of a light beam so as to perform an indication.

Figure 6E:
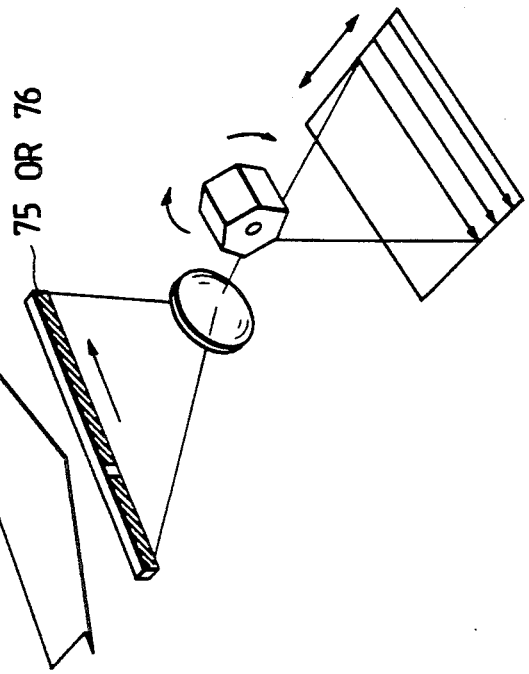
FIGS. 6A to 6F show optical scanning systems according to another embodiment of this invention.
Figure 6F:
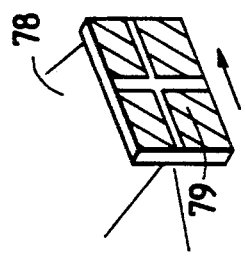
Figure 6A:
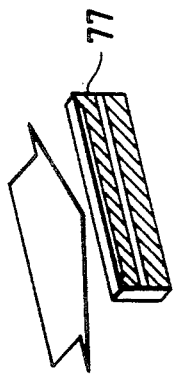
Figure 6B:
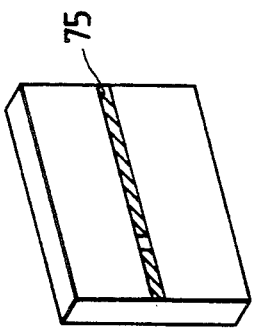
Figure 6C:
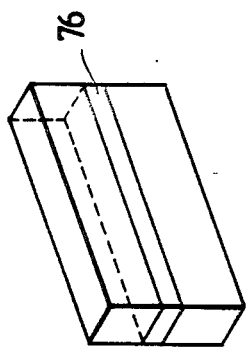
Figure 6D:
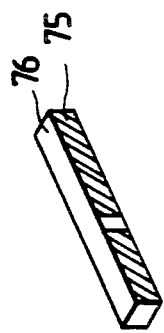

Further examples of scanning systems will be described hereinbelow with reference to FIGS. 6A to 6F. FIG. 6B shows a beam-narrowing device equipped with a belt-like electrode 75 and FIG. 6C illustrates a beam-narrowing device provided with a belt-like light modulation member 76. In these cases, a light-transmission region is formed in the belt-like electrode 75 or belt-like light modulation member 76 so as to be movable in the longitudinal directions of the belt-like electrode 75 or the belt-like light modulation member 76. Thus, if the light emitted from the FIG. 6B or 6C beam-narrowing device is arranged to be deflected by an appropriate device such as a galvano mirror device in directions (vertical directions in the figure) perpendicular to the longitudinal directions (horizontal directions in the figure) of the belt-like electrode 75 or light modulation member 76 as illustrated in FIG. 6E, this can be used as a two-dimensional scanning system. FIG. 6D shows a combination of the belt-like electrode 75 and the belt-like light modulation member 76. FIG. 6A shows a modification of the FIG. 6C beam-narrowing device, where the light modulation layer is not formed so as to have a belt-like configuration but the beam-narrowing device is provided with a mask 77 which has a slit-like light transmission portion whose longitudinal directions are normal to the longitudinal directions of a light-transmission region to be formed. The mask may be constructed by depositing chromium or others on a glass plate. FIG. 6F shows another modification in which an electromagnetic radiation beam 78 having a narrow cross section is emitted toward a narrow light transmission region 79 of the beam-narrowing device for one-dimensional scanning.

FIG. 7 shows an optical arrangement for writing an image on a photo-photo converting device 80 by means of the above-described two-dimensional scanning system. The photo-photo converting device 80 comprises a light modulation layer which may be made of an appropriate light modulation material such as an electro-optic crystal PLZT (for example, lithium niobate), a TN liquid crystal, a scattering-type liquid crystal, a ferroelectric liquid crystal and others. For example, as illustrated in FIG. 8, the photo-photo converting device 80 is constructed such that the light modulation layer 81 and a photoconductive layer 82 are disposed to face each other. If required, a dielectric mirror layer 83 is interposed therebetween. A first electrode 84 is disposed on the other surface of the light modulation layer 81 and a second electrode 85 is disposed on the other surface of the photoconductive layer 82. The first and second electrodes 84 and 85 are further sandwiched from the outsides by base plates 86. The photo-photo converting device 80 can have a function that an image can be written with an extremely weak electromagnetic beam. Moreover, the photo-photo converting device 80 can be used as a direct view display device whereby the written image is directly visible.

FIG. 9 shows a displaying apparatus including the optical system illustrated in FIG. 7, the displaying apparatus being arranged to project onto a screen 87 a reading light beam modulated in correspondence with the writing operation. In the displaying apparatus is provided a reading light source 88 which emits a reading light beam. The reading light beam emitted from the reading light source 88 is introduced through a polarizing beam splitter 89 to the photo-photo converting device 80 and reflected thereon. The light beam reflected therefrom passes through the same polarizing beam splitter 89 so as to reach the screen 87 after passing through a lens 90 for image indication.

Figure 10:
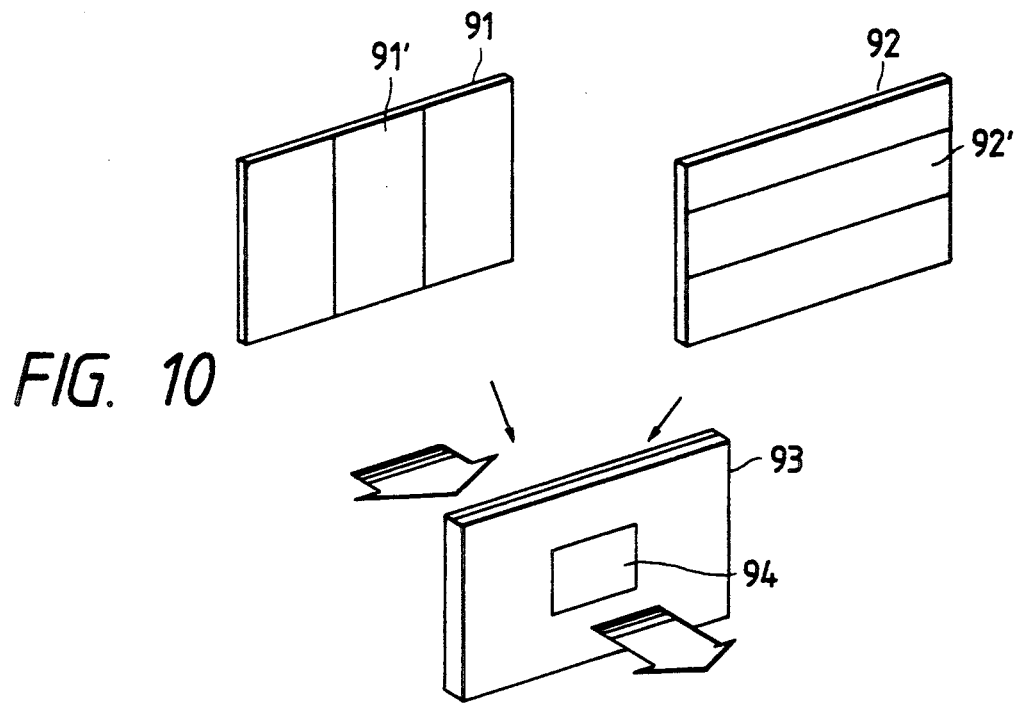
FIGS. 10 and 11 are perspective views for describing a further displaying apparatus which includes one of the optical scanning systems.
Figure 11:
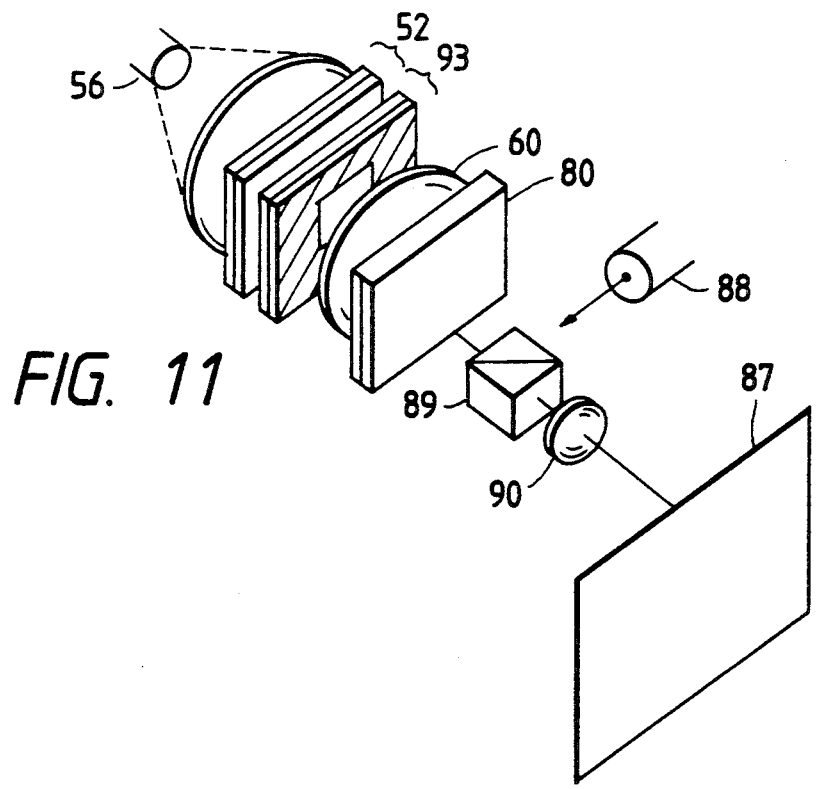

FIG. 10 shows an optical device comprising first and second beam-narrowing devices 91 and 92. Each of the first and second beam-narrowing devices 91 and 92 has a light-transmission region 91' or 92' whose widths are relatively wide as compared with those in the above-mentioned beam-narrowing devices 30 and 32. The first and second beam-narrowing devices 91 and 92 are combined with each other so that the longitudinal axes of the light-transmission regions 91' and 92' intersect at right angles to each other, thereby forming the optical device 93 having a rectangular light-transmission region 94. If additionally using this optical device 93 for the displaying apparatus in FIG. 9, a displaying apparatus is newly constructed as illustrated in FIG. 11 where the optical device 93 is provided between the scanning system 52 and the lens 60 so as to partially limit the image information. Thus, this is suitable in the case of trimming the writing light beam or restricting the reading light beam. When using this optical device 93 for trimming the writing light beam, it is possible to provide a high-resolution displaying apparatus. Further, it is not required to perform the fine machining such as an electrode matrix construction.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An electromagnetic radiation beam scanning system comprising:
   a light modulation layer showing an electro-optic effect;
   first and second electrodes sandwiching said light modulation layer, said first electrode having a transparent section and a pair of terminal sections placed at end portions of said transparent section, an impedance of each of said pair of terminal sections being much lower than an impedance of said transparent section;
   first and second polarizers sandwiching said light modulation layer;
   first power source means for applying a first voltage to said pair of terminal sections;
   second power source means for applying a second voltage to said second electrode; and
   light source means or emitting an electromagnetic radiation beam toward said light modulation layer, wherein said light modulation layer has an elongated region in which an effective voltage for the electro-optic effect becomes zero in response to application of said voltages to said pair of terminal sections nd second electrode due to said first and second power source means thereby causing said light modulation layer, combined with said polarizers, to produce a narrowed beam when a light beam is introduced thereto from said light source means.

2. A scanning system as claimed in claim 1, wherein said light source means is arranged to emit the electromagnetic radiation beam whose cross section is narrow, so that the longitudinal axis of the electromagnetic radiation beam intersects the longitudinal axis of the light transmission region in said light modulation layer.

3. An electromagnetic radiation beam scanning system comprising first and second beam-narrowing devices each of which includes a light modulation layer showing an electro-optic effect;
   first and second electrodes sandwiching said light modulation layer, said first electrode having a transparent section and a pair of terminal sections placed at end portions of said transparent section, an impedance of each of said pair of terminal sections being much lower than an impedance of said transparent section; first and second polarizers sandwiching said light modulation layer; first power source means for applying a first voltage to said pair of terminal sections; and second power source means for applying a second voltage to said second electrode, said light modulation layer having an elongated region in which an effective voltage for the electro-optic effect becomes zero in response to application of said voltages to said pair of terminal sections and second electrode due to said first and second power source means; wherein said light modulation layer combined with said polarizers produce a narrowed beam when a light beam is incident thereon, and said first and second beam-narrowing devices are overlapping so that said elongated light-transmission regions intersect each other.

4. A scanning system as claimed in claim 3, wherein the position of each of the light-transmission regions in each of said first and second beam-narrowing devices is movable in response to variation of at least one of the application voltages due to said power source means.

5. An electromagnetic radiation beam scanning system comprising:
   first and second beam-narrowing devices each of which includes a light modulation layer showing an electro-optic effect, first and second electrodes sandwiching said light modulation layer, said first electrode having a transparent section and a pair of terminal sections placed at end portions of said transparent section, an impedance of each of said sari of terminal sections being much lower than an impedance of said transparent section, and said beam-narrow device further including first and second polarizers sandwiching said light modulation layer; first power source means for applying a first voltage to said pair of terminal sections and second power source means for applying a second voltage to said second electrode, said light modulation layer having an elongated region in which an effective voltage for the electro-optic effect becomes zero in response to application of said voltages to said pair of terminal sections and second electrode due to said power source means thereby causing said light modulation layer, combined with said polarizers, to produce a narrowed beam when an electromagnetic radiation beam is incident thereon, said first and second beam-narrowing devices overlapping each other so that said elongated light-transmission regions intersect each other; and
   light source means for emitting the electromagnetic radiation beam toward said optical scanning system, said electromagnetic radiation beam from said light source means being modulated in accordance with a displaying signal.

6. An electromagnetic radiation beam scanning system comprising: a light modulation layer showing an electro-optic effect; first and second electrodes disposed to sandwich said light modulation layer, said first electrode having a transparent section and a pair of terminal sections placed at end portions of said transparent section, an impedance of each of said pair of terminal sections being much lower than an impedance of said transparent section; first and second polarizers sandwiching said light modulation layer; first power source means for applying a first voltage to said pair of terminal sections; and second power source means for applying a second voltage to said second electrode, said scanning system further comprising a mask having a slit-like light transmission region whose longitudinal axis is perpendicular to the elongated light-transmission region of said light modulation layer so s to form a spotting light beam from an electromagnetic radiation beam incident ton said light modulation layer.

7. A displaying apparatus comprising:

an optical scanning system includes a light modulation layer showing an electro-optic effect and first and second electrodes disposed to sandwich said light modulation layers, first and second polarizers sandwiching said light modulation layer, at least one of said light modulation layer and said first and second electrodes having a belt-like configuration, said light modulation layer combined with said polarizers forming an elongated light-transmission region in response o application of voltages to said first and second electrodes;

light source means for emitting an electromagnetic radiation beam which is modulated in accordance with an indication signal including indication information; and photo-photo converting means on which image information is written by the electromagnetic radiation beam from said optical scanning system, said photo-photo converting means comprising at least a photoconductive layer and a light modulation layer.

8. A displaying apparatus as claimed in claim 7, further comprising an optical system for generating a reading light beam which is modulated in correspondence with the writing on said photo-photo converting means and which is introduced into said photo-photo converting means and then reflected thereon to be directed to a screen for indication.

9. A displaying apparatus comprising:

an optical scanning system including a light modulation layer showing an electro-optic effect and first and second electrodes disposed to sandwich said light modulation layer, first and second polarizers sandwiching said light modulation layer, said light modulation layer combined with said polarizers forming an elongated light-transmission region in response to application of voltages to said first and second electrodes, said scanning system further comprising a mask having a slit-like light transmission region whose longitudinal axis is perpendicular to the elongated light transmission region of said light modulation layer so as to form a spotting light beam from an electromagnetic radiation beam incident on said light modulation layer;

light source means for emitting an electromagnetic radiation beam which is modulated in accordance with a displaying signal including indication information; and photo-photo converting means on which image information is written by the electromagnetic radiation beam from said optical scanning system, said photo-photo converting means comprising at least a photoconductive layer and a light modulation layer.

10. A displaying apparatus as claimed in claim 9, further comprising an optical system for generating a reading light beam which is modulated in correspondence with the writing on said photo-photo converting means and which is introduced into said photo-photo converting means and then reflected thereon to be directed to a screen for indication.

* * * * *